Patented June 17, 1930

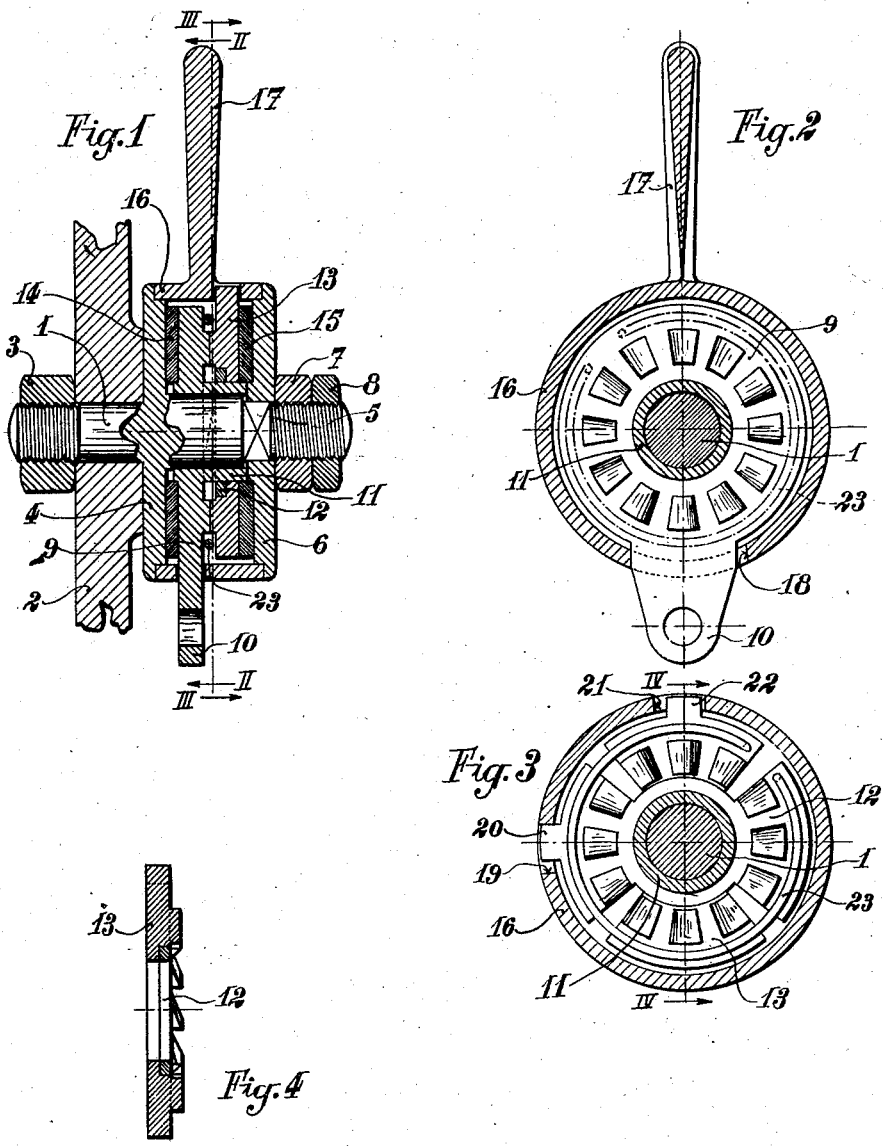

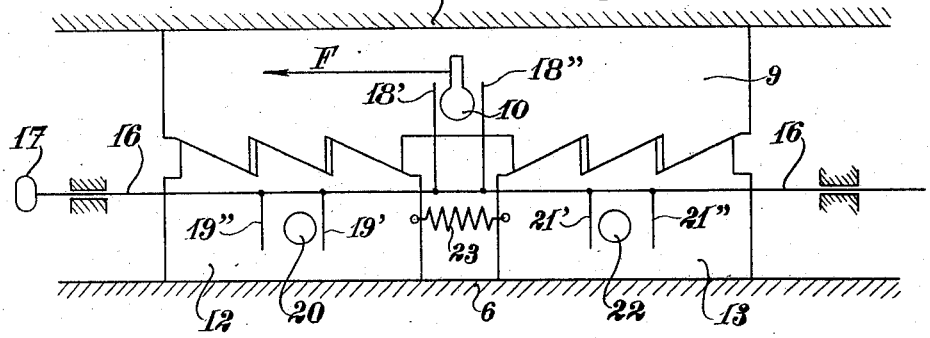
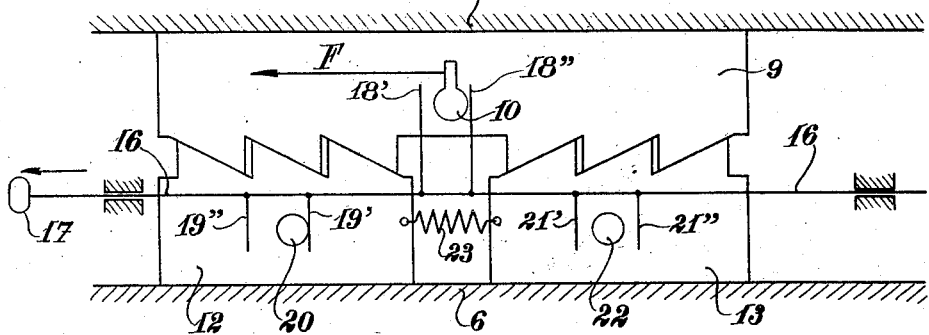
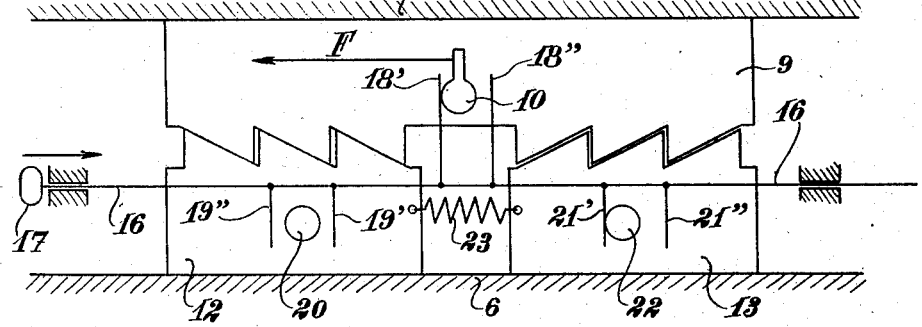

1,764,937

UNITED STATES PATENT OFFICE

GUY DE BONAL, OF GENAS, AND PIERRE MASSON, OF VILLEURBANNE, FRANCE

SELF-LOCKING CONTROL DEVICE

Application filed November 13, 1928, Serial No. 319,136, and in France November 16, 1927.

My invention relates to a device adapted to lock a mechanism in any desired position while permitting its hand control.

Devices of this kind are known, which embody teeth and movable keys. They provide a step-by-step regulation, not a continuously progressive one.

In my French patent filed November 16th, 1927, I have also described a device insuring a progressive regulation and a self-locking action, by means of shoes, jammed between a movable member and a fixed one.

The device according to the present invention comprises members provided with ratchet teeth and means adapted to unlock the teeth before acting on the mechanism to which the device is adapted.

My invention is more particularly intended for use on automobiles, for the hand control of the brakes, in lieu of the ordinary lever locked by means of teeth and a movable key. In such a case, the mechanism is to be locked only in one direction, against the springs restoring the brake shoes to their inactive position. But in other applications, the mechanism must be locked in either direction.

The annexed drawing illustrates a device according to my invention, adapted to lock the mechanism to which it is adapted, in both directions.

Fig. 1 is a longitudinal section of the device.

Fig. 2 is a cross-section of the same on line II—II (Fig. 1).

Fig. 3 is a cross-section on line III—III (Fig. 1).

Fig. 4 is a longitudinal section of the jamming plate along line IV—IV (Fig. 3).

Figs. 5 to 7 diagrammatically illustrate the working of the device.

The device comprises a shaft 1 fixed to a frame 2 by means of a nut 3. This shaft is made with an integral flange 4 and it is provided with a portion 5 rectangular in section, on which fits a second flange 6. On the threaded end of shaft 1 are screwed two nuts 7 and 8.

A plate 9, which will be termed hereafter the "master-plate," is loose on shaft 1, between flanges 4 and 6. This plate is provided with a tail 10 to which is attached the cable or rod which connects the device with the mechanism to be controlled.

Another plate, termed the "jamming plate", is loose on the hub 11 of plate 9, between the same and flange 6, and comprises two elements 12 and 13 (Figs. 3 and 4) loose with respect to each other, each one comprising a central hub and two opposed sectors. The elements 12 and 13 are placed crosswise, as shown.

These elements are provided with ratchet teeth on their faces which contact with plate 9. The teeth of element 12 are directed clockwise (Fig. 3) and the teeth of element 13 are directed anticlockwise.

Plate 9 is also provided with teeth arranged to cooperate with the teeth of elements 12 and 13.

Disks 14 and 15, made of impregnated wood, fiber, leather or any other suitable material having a high frictional coefficient, are interposed between the master plate 9 and flange 4 and between the jamming plate 12—13 and flange 6.

A hub 16 is arranged to rotate freely on flanges 4 and 6. This hub is integral with the driving handle 17. It comprises three radial openings, the first one 18 for the free passage of tail 10 (Fig. 2), a second one 19 for a tail 20 projecting radially from toothed element 12, a third one 21 for a tail 22 projecting from element 13 (Fig. 3).

A spring 23 connects elements 12 and 13 together and tends to rotate the same with respect to each other in such a direction that the plates are pressed towards the flanges under the action of the ratchet teeth.

The working of the device will be readily understood from Figs. 5 and 7 which diagrammatically represent a development of the device, or, if preferred, a device of the same kind, arranged for rectilinear motion. The master plate 9 and the elements 12—13 of the jamming plate are in the form of slides cooperating together between guides 4 and 6. As clearly shown, the traction spring 23 tends to jam the members together under the action of the inclined edges of the ratchet teeth. The driving hub 16 is represented by a rod provided with forks through which pass the tails 10, 20 and 22 of plate 9 and of elements 12 and 13.

The mechanism to be controlled is connected to tail 10 and it is represented by the force F which it exerts on tail 10. This force F may vary in value and in direction.

It will be clearly understood from Fig. 5 that the force F, as illustrated, will jam together the plate 9 and the element 12 if the angle of the inclined edges of the teeth is small enough. The device is thereby locked.

When the handle 17 is moved in the direction of force F (Fig. 6), the finger 19′ of the fork 19′—19″ through which is passed the tail 20 of element 12, engages tail 20. Any further movement of rod 16 tends to unlock element 12. But, as soon as the same is unlocked, plate 9 moves under the action of force F and the members are again locked together.

Of course, this necessitates that the finger of the fork 21′—21″ does not engage tail 22. tail 10 does not engage the same before finger 19′ engages tail 20, and also that finger 21″ of the yoke 21′—21″ does not engage tail 22.

When handle 17 is moved in the reverse direction (Fig. 7), finger 21′ cooperates with tail 22 and element 13 is unlocked from plate 9. For a further movement of rod 16, finger 18′ cooperates with tail 10 and plate 9 is positively driven. The element 13 being unlocked, plate 9 may be freely moved against force F, provided finger 19″ does not engage tail 20 before finger 18′ engages tail 10 (which would jam element 12 against plate 9). When handle 17 is released, force F again locks plate 9 and element 12 together.

Since the device is symmetrical in construction, it will work in the same manner when the force F is reversed in direction so that handle 17 thus permits the control of the mechanism represented by force F, whatever may be the direction of this force.

The above description with reference to Figs. 5 to 7, is readily applicable to the apparatus of Figs. 1 to 4. Disks 14 and 15, having a high frictional coefficient, avoid any incidental slipping in the presence of oil or grease and nuts 7 and 8 permit the adjustment of the axial play of the plates and the compensation of the wear.

When the mechanism to be controlled exerts on the device a force of constant direction (which is the case for an automobile brake, for instance), one element of the jamming plate may be dispensed with. For example, if the force F (Figs. 5 to 7) has always the direction represented, element 13 may be omitted, spring 23 being attached to plate 9 so as to always tend to jam plate 9 and element 12 together. The jamming plate is then practically a circular plate similar to plate 9 (Figs. 1 to 4). The working remains the same, except that the device is self-locking in one direction only.

We claim:

1. A device of the character and for the purpose described comprising a movable master member connected with the mechanism to be controlled; a movable jamming member cooperating with said master member; ratchet teeth on said master member; ratchet teeth on said jamming member, the first-named ratchet teeth being adapted to cooperate with the second-named ratchet teeth; fixed surfaces between which said master and jamming members are interposed; spring means adapted to move said jamming member in such a direction that said master and jamming members are separated from each other under the action of said ratchet teeth and are thus pressed and jammed against said fixed surfaces, whereby the device is locked; and control means adapted to unlock said jamming member and to drive said master member.

2. A device as claimed in claim 1, wherein the master and jamming members are in the form of plates having a common axis and provided with ratchet teeth on their contacting faces.

3. A device as claimed in claim 1, wherein the spring means comprises a spring connected to both parts of the jamming member and adapted to move the same with respect to each other so as to jam the device.

4. A device of the character and for the purpose described, comprising a movable master plate connected to the mechanism to be controlled; a movable jamming plate coaxial with said master plate; ratchet teeth on said master plate; ratchet teeth on said jamming plate, the first-named ratchet teeth being adapted to cooperate with the second-named ratchet teeth; fixed flanges between which said plates are enclosed; spring means adapted to move said jamming plate in such a direction that said master and jamming plates are separated from each other under the action of said ratchet teeth and are thus pressed and jammed against said fixed flanges, whereby the device is locked; and a control hub co-axial with said plates and provided with means to unlock said jamming plate and to drive said master plate.

5. A device as claimed in claim 4, wherein the master and jamming plates are provided with radial tails projecting through apertures provided in the control hub, said tails and apertures being so located and dimensioned that, when said control hub is rotated in one direction, it unlocks the jamming plate, and, for the other direction, it directly drives the master plate.

6. A device of the character and for the purpose described, comprising a movable master member connected with the mechanism to be controlled; a movable jamming member cooperating with said master member, said jamming member being formed of two elements loose with respect to each other; ratchet teeth on each element of said jamming member, the teeth of one element being inverted in direction with respect to those of the other one; ratchet teeth on said master member adapted to cooperate with the first-named teeth of said jamming member; fixed surfaces between which said master and jamming members are interposed; spring means adapted to move the elements of said jamming member with respect to each other in such a direction that said master and jamming members are separated from each other under the action of said ratchet teeth and are thus pressed and jammed against said fixed surfaces, whereby the device is locked; and control means adapted to unlock said jamming member and to drive said master member.

7. A device as claimed in claim 6, wherein the master member is in the form of a plate, the jamming member being formed of two elements each comprising a central hub and two opposite sectors, said elements being arranged crosswise so as to form a composite jamming plate, said master and jamming plates being co-axial and provided with ratchet teeth on their contacting faces.

8. A device as claimed in claim 6, wherein the spring means comprises a spring connected to both elements of the jamming member.

9. A device of the character and for the purpose described, comprising a master plate connected to the mechanism to be controlled; a jamming plate co-axial with said master plate, said jamming plate being formed of two elements loose with respect to each other, each comprising a central hub and two opposite sectors, said elements being arranged crosswise so as to form a composite jamming plate; ratchet teeth on each element of said jamming plate, the teeth of one element being inverted in direction with respect to those of the other one; ratchet teeth on said master plate adapted to cooperate with the first-named teeth of said jamming plate; fixed flanges between which said master and jamming plates are enclosed; spring means adapted to move the elements of said jamming plate with respect to each other in such a direction that said master and jamming plates are separated from each other under the action of said ratchet teeth and are thus pressed and jammed against said fixed flanges, whereby the device is locked; and a control hub co-axial with said plates and provided with means to unlock said jamming plate and to drive said master plate.

10. A device as claimed in claim 9, wherein the master plate and each element of the jamming plate are provided with radial tails projecting through apertures provided in the control hub, said apertures being so located and dimensioned that, when said control hub is rotated in any direction, it first unlocks the jamming plate and then drives the master plate.

In testimony whereof we affix our signatures.

GUY DE BONAL.
PIERRE MASSON.